United States Patent [19]

Roller et al.

[11] Patent Number: 5,346,761
[45] Date of Patent: Sep. 13, 1994

[54] FLEXIBLE MAGNETIC RECORDING MEDIA HAVING A BACKING COATING CONTAINING A POLYURETHANE RESIN HAVING A PHOSPHATE GROUP AND PRECIPATED SILICA

[75] Inventors: Hermann Roller, Ludwigshafen; Peter Engelhardt, Hessisch Oldendorf; Reinhold Baur, Ortenberg; Michael Bobrich, Boehl-Iggelheim; Werner Latzel, Oberkirch; Werner Lenz, Bad Durkheim; Rudolf Suettinger, Heidelberg, all of Fed. Rep. of Germany

[73] Assignee: BASF Magnetics GmbH, Mannheim, Fed. Rep. of Germany

[21] Appl. No.: 60,975

[22] Filed: May 14, 1993

[30] Foreign Application Priority Data

May 21, 1992 [DE] Fed. Rep. of Germany ....... 4216847

[51] Int. Cl.$^5$ ................................................. G11B 5/00
[52] U.S. Cl. ..................... 428/331; 428/340; 428/404; 428/407; 428/423.1; 428/694 TB; 428/694 BB; 428/900
[58] Field of Search .................. 428/694 TB, 694 BB, 428/900, 331, 340, 404, 407, 423.1

[56] References Cited

U.S. PATENT DOCUMENTS

| | | | |
|---|---|---|---|
| 3,293,066 | 12/1966 | Haines | 117/68 |
| 4,074,002 | 2/1978 | Hack et al. | 428/331 |
| 4,135,031 | 1/1979 | Akashi et al. | 428/323 |
| 4,534,999 | 8/1985 | Roller et al. | 427/130 |
| 4,612,244 | 9/1986 | Kaneda et al. | 428/323 |
| 4,735,325 | 4/1988 | Remmers | 211/187 |
| 4,770,932 | 9/1988 | Matsumoto et al. | 428/323 |
| 4,780,365 | 10/1988 | Kakuishi et al. | 428/323 |
| 4,789,583 | 12/1988 | Akutsu | 428/143 |
| 5,039,554 | 8/1991 | Ishikuro et al. | 427/131 |

FOREIGN PATENT DOCUMENTS

| | | |
|---|---|---|
| 101020 | 8/1982 | European Pat. Off. . |
| 105471 | 9/1987 | European Pat. Off. . |
| 3436262 | 5/1985 | Fed. Rep. of Germany . |
| 8526415 | 7/1985 | Fed. Rep. of Germany . |
| 4117980 | 5/1991 | Fed. Rep. of Germany . |
| 1197661 | 7/1970 | United Kingdom . |

*Primary Examiner*—Stevan A. Resan
*Attorney, Agent, or Firm*—Keil & Weinkauf

[57] ABSTRACT

In flexible magnetic recording media consisting essentially of a web-like nonmagnetic substrate, the magnetic layer is applied to one main side of the web-like substrate and a backing coating formed on the opposite main side of the substrate from a polymeric binder and nonmagnetic fillers as well as supporting pigments, the backing coating contains a precipitated silica treated on the surface with a phosphate-containing polyurethane.

2 Claims, No Drawings

“5,346,761”

FLEXIBLE MAGNETIC RECORDING MEDIA HAVING A BACKING COATING CONTAINING A POLYURETHANE RESIN HAVING A PHOSPHATE GROUP AND PRECIPATED SILICA

BACKGROUND OF THE INVENTION

1. Field of the Invention

The present invention relates to flexible magnetic recording media, consisting essentially of a web-like nonmagnetic substrate, a magnetic layer applied to one main side of the web-like substrate and a backing coating formed on the opposite main side of the substrate from a polymeric binder and nonmagnetic fillers as well as supporting pigments.

2. Description of Related Art

It is known that flexible magnetic recording media can be provided with backing coatings containing nonmagnetizable, nonconductive and/or conductive substances. U.S. Pat. No. 3,293,066 states that electrostatic charges on magnetic tapes, which can form in recorders having high tape speeds, can be eliminated by applying conductive backing coatings and in addition the backs of the tapes can be made more hard-wearing by means of backing coatings. It is furthermore disclosed in GB-A 1 197 661 and U.S. Pat. No. 4,135,031 that the winding properties of magnetic tapes can be improved by applying backing coatings having a predetermined surface roughness. Such backing coatings are also known for magnetic cards. EP-A 101 020 discloses special binder mixtures which, particularly with the addition of carbon black, give backing coatings with an excellent adhesive strength, wear resistance and stability under high temperature and humidity conditions.

Such backing layers are of particular importance in video tapes, in particular in those for the home video sector. Thus, for improving the scratch resistance and for reducing the drop out number, inter alia U.S. Pat. No. 4,735,325 proposes a backing coating which consists of carbon black having different particle sizes and of fillers having a Moh's hardness of >8 dispersed in a polymeric binder. In addition to an improvement in the wear resistance and a reduction in the abrasiveness, the proposed backing coatings also serve for reducing the light transmittance of the tape material, which is necessary in particular when such tapes are used on commercial video recorders. For this purpose, EP-A 105 471 proposes a backing coating based on barium sulfate/α-iron(III) oxide with or without particular carbon black additives.

U.S. patent application Ser. No. 07/888713, filed May 27, 1992 provides transparent backing coatings for magnetic recording media, which coatings meet the requirements with regard to the mechanical properties, such as wear resistance and abrasiveness, as well as having sufficient light transmittance, so that a corresponding magnetic recording medium can also be used for the thermoduplication method (TMD method).

The dispersions of the stated components are prepared in dispersing apparatuses, generally referred to as mills, with the aid of which and by the action of a medium to high shear gradient, depending on the design of the mill, the powdered materials are substantially separated into their individual particles and are covered with a binder and/or wetting agent. Owing to the method of preparation as well as the subsequent working up of the nonmagnetic powder materials, agglomerates composed of individual particles having very different secondary particle diameters are formed. For the production of high quality backing coatings, however, it is necessary for the solids, depending on the properties, to be present for the backing coating in the form of the substantially identically shaped individual particles having a predetermined roughness and uniform distances apart. To achieve this in an economically acceptable time, dispersing machines having a high local energy density, for example stirred ball mills, planetary ball mills, sand mills or attritors, are used, as described in, for example, DE-A 35 26 415 for magnetic layers. However, the known dispersing methods have a particular disadvantage. By introducing very high energy densities and using grinding media in a diameter of from 0.2 to 4.0 mm, usually from 0.6 to 2.0 mm, the pigment agglomerates are substantially divided up into their individual particles and the wettable pigment surface is thus increased. In the case of a constant dispersant and/or binder adsorption layer, the binder adsorption layer becomes thinner with increasing degree of division, with the result that the elastic deformation of the adsorption layers which is required for steric stabilization is no longer ensured and the elastic entropic and osmotic repulsion effects can no longer develop to a sufficient extent. The result is that dispersions, in this case particularly backing coating dispersions, often exhibit instability. This is evident, for example, in the comparison with the gloss of two manually applied coatings, one produced immediately after the end of dispersing and the other a few hours later after the dispersion has been stirred in the storage container. The gloss value of the second manually applied coating is substantially below that of the first, this being associated with an undesirable increase in the layer roughness. This problem cannot be solved by using known and conventional dispersants, such as soybean lecithin, phosphoric acid derivatives of the Gafac type, etc.

However, the constant requirement for higher recording densities and maximum electroacoustic and video values with increasingly small thicknesses of the magnetic layers requires homogeneous, extremely smooth surfaces of the recording media and finely rough, defect-free backing coatings.

SUMMARY OF THE INVENTION

It is an object of the present invention to provide, under the given technical conditions, a backing coating dispersion which remains stable after the end of the dispersing procedure, i.e. exhibits neither a decrease in gloss nor an increase in roughness and meets the requirements with regard to the mechanical properties, such as wear resistance and abrasiveness.

DESCRIPTION OF THE PREFERRED EMBODIMENTS

We have found that this object is achieved by magnetic recording media consisting essentially of a nonmagnetic substrate film, a magnetic layer applied to one main side of the substrate and a backing coating formed on the opposite main side of the substrate from a polymeric binder and nonmagnetic fillers as well as supporting pigments, if the backing coating contains from 15 to 40% by volume, based on the volume of the backing coating, of a precipitated silica which has an $SiO_2$ content of from 98 to 99.5%, a pH of from 5 to 7 and a specific surface area of from 90 to 650 $m^2/g$ and whose surface has been treated with from 0.05 to 0.25 $mg/m^2$ of a polyester/polyetherurethane which has a mean molecular weight $M_w$ of from 40,000 to 120,000 and contains phosphate groups in an amount of from 10 to 100 milliequivalents of phosphate per kilogram of polyurethane.

The precipitated silica present in the backing layer of the novel recording media and having a specific surface area of from 90 to 650, in particular from 100 to 150, $m^2/g$ furthermore has a secondary particle size of from 3 to 4 μm. The surface of this silica has been treated with a phosphate-carrying polyurethane whose molecular weight $M_w$ is from 40,000 to 120,000, in particular from 60,000 to 70,000, the ratio of $M_w$ to $M_n$ being from 1.3 to 3.0. The amount of phosphate groups, which may be both side groups and terminal groups, is from 10 to 100, in particular from 40 to 80, milliequivalents per kg of polyurethane. The density of the material is from 1.16 to 1.20 $g/cm^3$ and the glass transition temperature Tg is from $-5620$ to $+70°$ C. These polyurethanes are products based on polyester/polyether/MDI. Corresponding polyurethanes are known. Owing to the polar groups in the molecule, they are rather moisture-sensitive and must therefore be mixed with other organic polymers. Suitable organic polymers of this type are the conventional binders. These are polyvinylformals, polyurethane elastomers, mixtures of polyisocyanates and relatively high molecular weight polyhydroxy compounds, nitrocelluloses, vinyl chloride polymers containing more than 60% of vinyl chloride building blocks, copolymerized vinyl chloride with one or more unsaturated carboxylic acids of 3 to 5 carbon atoms as comonomer or hydroxyl-containing vinyl chloride copolymers which can be prepared by partial hydrolysis of vinyl chloride/vinyl ester copolymers or direct copolymerization of vinyl chloride with hydroxy-containing monomers, such as allyl alcohol or 4-hydroxybutyl or 2-hydroxyethyl (meth)acrylate, said polymers being soluble in conventional solvents. Other suitable binders are mixtures of one or more polarethane elastomers with polyvinylformals, phenoxy resins and vinyl chloride copolymers of the abovementioned composition.

Cyclic ethers, such as tetrahydrofuran and dioxane, and ketones, such as methyl ethyl ketone and cyclohexanone, are preferably used as solvents for the preparation and processing of the polymers. Of course, polyurethanes can also be dissolved in other strongly polar solvents, such as dimethylformamide, pyrrolidone, dimethyl sulfoxide or ethylglycol acetate. It is also possible to mix the stated solvents with aromatics, such as toluene or xylene, and esters, such as ethyl or butyl acetate.

Suitable fillers are likewise known products, such as calcium carbonate, barium sulfate and/or gypsum having a mean agglomerate size of from 0.05 to 4 μm. Spherical polyolefin having a particle size of from 10 to 1000 μm may also be used, as can carbon black.

For dispersing, the components are mixed with the dissolved organic polymer alone or with known and conventional dispersants, such as soybean lecithin, saturated and unsaturated, straight-chain and branched fatty acids, fatty acid salts, quaternary ammonium compounds and phosphoric acid derivatives, and processed in a known dispersing apparatus. It may also be advantageous to add conventional lubricants, such as fatty acids, fatty esters, silicone oils or fluorine-based additives, to these backing coatings.

The dispersion intended for the backing coating is prepared in a vertical or horizontal stirred ball mill. It has proven advantageous to admix the phosphate-containing polyurethanes both in the dispersing phase and in the milling phase (i.e. dispersing stages I and II), preferably in a ratio of from 40:60 to 60:40. The backing coating is preferably applied using an engraved roller. For evaporation of the solvents and drying or hardening of the backing coating, the latter is passed through a heat tunnel. It is possible to apply the magnetic layer dispersion and backing coating dispersion in one operation or in succession. If necessary, the coated films can be calendered and compacted on conventional machines by being passed between heated and polished rollers, with or without the use of pressure. The thickness of the backing coating is less than 5.0, in particular less than 2.5, preferably from 0.3 to 1.0 μm.

In an advantageous embodiment of the novel magnetic recording media, the backing coating is composed of from 3 to 60, in particular from 5 to 30,% by volume of a polyurethane containing from 10 to 100, preferably from 40 to 80, milliequivalents of phosphate per kg of product and having a molecular weight $M_w$ of from 40,000 to 120,000, preferably from 60,000 to 70,000, a ratio $M_w/M_n$ of about 1.8 and a Tg of 36° C., from 10 to 35, preferably from 15 to 30,% by volume of a linear polyesterurethane obtained from adipic acid, 1,4-butanediol and 4,4'-diisocyanatodiphenylmethane, from 10 to 40, preferably from 15 to 35,% by volume of a polyphenoxy resin obtained from bisphenol A and epichlorohydrin, from 5 to 30, preferably from 10 to 25,% by volume of a polyisocyanate resin, from 15 to 40, preferably from 20 to 25,% by volume of a precipitated silica having an $SiO_2$ content of from 98 to 99.5%, a pH of from 5 to 7 and a density of 1.9 $g/cm^3$, from 0.5 to 5, preferably from 1.5 to 3.5,% by volume of a cubic zinc ferrite having a mean particle size of from 0.1 to 0.5 μm, of a spherical $\alpha$-$Fe_2O_3$ or of an $Al_2O_3$ and from 1 to 10, preferably from 2.5 to 7.5,% by volume of a spherical 1d-polyolefin. In addition to the amounts of a known dispersant and of a lubricant, which do not exceed 5% by volume, it may be advantageous to replace the nonconductive fillers with up to 25% by volume of the carbon black.

Owing to the homogeneous backing coating, the novel magnetic recording media exhibit an extremely advantageous behavior. Because of the dispersion stability and homogeneity of the backing coating of such magnetic recording media, corresponding video tapes have a greatly reduced number of errors and substantially improved electromagnetic values compared with those of the prior art.

The Examples which follow illustrate the invention, in comparison with prior art experiments. In the Examples and Comparative Experiments which follow, parts and percentages are by volume, unless stated otherwise. The molecular weights given for the polyurethane and polyolefin are weight average molecular weights $M_w$, as determined by gel permeation chromatography.

EXAMPLE 1

3,325 parts of zirconium dioxide balls having a diameter of 1.0–2.5 mm, 79.02 parts of a 12.5% strength solution of a polyurethane based on polyester/polyether/diphenylmethane diisocyanate MDI and having an average molecular weight of 70,000, a phosphate content of 40 milliequivalents/kg of product and an adsorption of 0.08 $mg/m^2$ on a precipitated silica having a mean secondary particle size of 3 μm in a mixture of 46.94 parts of tetrahydrofuran and 40.65 parts of dioxane, 105.82 parts of a 16.83% strength solution of a polyphenoxy resin obtained from bisphenol A and epichlorohydrin and having 6% by weight of hydroxyl groups in a mixture of 44.62 parts of tetrahydrofuran and 38.55 parts of dioxane, 73.5 parts of a 10.62% strength solution of a linear polyesterurethane resin, prepared from adipic acid, 1,4-butanediol and 4,4'-diisocyanatodiphenylmethane in a mixture of 47.95 parts of tetrahydrofuran and 41.43 parts of dioxane, 3.8 parts of an isomeric $C_{18}$-carboxylic acid, 837 parts of a mixture of 449 parts of tetrahydrofuran and 388 parts of dioxane, 71.5 parts of the stated precipitated silica, 6.8 parts of a cubic zinc ferrite having a mean particle size of 0.12 μm and 9.2 parts of a polyolefin having an average molecular weight of 3,000 and a mean spherical particle diameter of 500 μm were introduced into a batchwise stirred ball mill having a volume of 10,000 parts. The stirred ball mill was then closed and the content were dispersed for 6 hours. Thereafter, the mill was opened again, 79.02 parts of a 12.5% strength solution of the polyurethane described above in a mixture of 46.94 parts of tetrahydrofuran and 40.56 parts of dioxane, 437.75 parts of a 16.83% strength solution of the polyphenoxy resin described above in a mixture of 44.62 parts of tetrahydrofuran and 38.55 parts of dioxane, 15.40 parts of a 9.26% strength solution of dibutyltin dilaurate in a mixture of 48.68 parts of tetrahydrofuran and 42.06 parts of dioxane, 6.9 parts of an 8.5% strength solution of a fluorine additive in a mixture of 49.10 parts of tetrahydrofuran and 42.4 parts of dioxane, 657 parts of a 10.62% strength solution of the linear polyesterurethane resin described above in a mixture of 47.95 parts of tetrahydrofuran and 41.43 parts of dioxane, and 1,644 parts of a mixture of 882 parts of tetrahydrofuran and 762 parts of dioxane were introduced and milling was continued for a further 3 hours.

The dispersion was then removed from the mill and divided up. One part was used for measuring the dispersion stability, and the second, larger part for coating. The dispersion stability was measured as follows: Glass bottles having a capacity of 100, 150 and 250 ml were filled to about ⅔ full with the dispersion to be investigated, and the bottles were closed and then placed on a roller stand. After one and 24 hours, the bottles were opened and in each case a coating was applied by means of a manual knife coater to a very smooth, 75 μm thick polyester film having an average peak-to-valley height of 40-50 nm. The gloss values of these coatings were determined with the aid of a gloss measuring apparatus and were compared with the values of the specially prepared dispersion, with which a manually applied coating was likewise produced prior to storage on the roller stand. In addition, the roughness of the manually applied coatings before and after storage on the roller stand was measured by known methods. In the case of stable dispersions, little or no change was observed compared with the initial values, whereas in some cases considerable changes were observed in the case of unstable dispersions.

The test provides information on whether a dispersion remains homogeneous during processing, for example during stirring and filtration in the storage container, or whether it becomes inhomogeneous due to flocculation, with all the resulting disadvantages, for example an increase in the roughness of the layers produced. The results of the stability test are shown in Table 1.

The second part of the dispersion is processed as follows: To wet the layer after application, 35 parts, per 1,000 parts of dispersion, of 41.6% strength solution of an isocyanate resin obtained from 1 mol of trimethylolpropane and 3 mol of toluylene diisocyanate in 58.4 parts of tetrahydrofuran were stirred for 15 minutes. After filtration through a paper filter, the dispersion was applied to a 15 μm polyethylene terephthalate film by means of an engraved roller and was dried in the drying tunnel of the coating apparatus. The backing coating thickness achieved was 0.5 μm.

The backing coating had been applied very uniformly and without any streak formation. The pigment volume concentration of the silica in the coating was 21.36%. For further processing, the magnetic layer, containing $CrO_2$ as the magnetic pigment, was then applied in a conventional manner in a thickness of 2.5 μm to the film side opposite the backing coating. After calendering, the film web was slit into 12.7 mm (½ inch) wide tapes.

The video values of the tapes were measured. The results are shown in Table 2.

EXAMPLE 2

The procedure described in Example 1 was followed, except that the 12.5% strength solution of the polyurethane having a molecular weight of 70,000 and a phosphate content of 40 milliequivalents/kg of product was added in dispersing stages I and II in a ratio of 30:70, and not 50:50 as in Example 1. The dispersion was likewise tested and further processed as stated in Example 1. The results are shown in the Tables.

EXAMPLE 3

The procedure described in Example 1 was followed, except that the 12.5% strength solution of the polyurethane having a molecular weight of 70,000 and a phosphate content of 40 milliequivalents/kg was divided in a ratio of 60:40 between dispersing stages I and II. The dispersion was tested and processed as stated in Example 1. The results are shown in the Tables.

EXAMPLE 4

The procedure described in Example 1 was followed, except that the 12.5% strength solution of the polyurethane having a molecular weight of 70,000 and a phosphate content of 40 milliequivalents/kg of product was added exclusively in dispersing stage II. The dispersion was tested and further processed as stated in Example 1. The results are shown in the Tables.

EXAMPLE 5

The procedure described in Example 1 was followed, except that the polyhenoxy resin stated in Example 1 was replaced with the same amount of a 14.78% strength solution of a vinyl chloride copolymer having an average molecular weight of 35,000 and a hydroxyl content of 1.8% by weight in a mixture of 45.74 parts of tetrahydrofuran and 39.51 parts of dioxane. The dispersion was tested and further processed as stated in Example 1. The results are shown in the Tables.

EXAMPLE 6

The procedure described in Example 1 was followed, except that the polyphenoxy resin stated in Example 1 was replaced with the same amount of a 16.04% strength solution of a polyvinylformal resin having an average molecular weight of 60,000 and a hydroxyl number of 75 mg KOH/g of substance in a mixture of 45.04 parts of tetrahydrofuran and 39.02 parts of dioxane. The dispersion was tested and further processed as stated in Example 1. The results are shown in the Tables.

EXAMPLE 7

In this Example, the proportion by volume of the polyurethane was increased from 6.18% to 22.84% and divided in a ratio of 40:60 between dispersing stages I and II and mixed with the polyvinylformal resin stated in Example 6, and furnace black having a surface area of 250 m$^2$/g was also present in addition to the pigments stated in Example 1. After preparation, the coating consisted of the following pigment volume concentrations: 15.87% of carbon black, 3.55% of precipitated silica and 1.8% of zinc ferrite. The dispersion was tested and further processed as stated in Example 1. The results are shown in the Tables.

EXAMPLE 8

The procedure described in Example 1 was followed, except that the 12.5% strength solution of the polyurethane having a molecular weight of 70,000 and a phosphate content of 40 milliequivalents/kg and the 10.62% strength solution of the linear polyesterurethane resin, prepared from adipic acid, 1,4-butanediol and 4,4'-diisocyanatodiphenylmethane, were replaced with equal amounts by volume of polyesterurethane resin prepared from 1,4-cyclohexanedimethanol, adipic acid, azelaic acid and 4,4'-diisocyanatodiphenylmethane and having a phosphate content of 78 milliequivalents/kg, a molecular weight of 71,000 and a Tg of 60° C. The coating contained 28.28% by volume of this resin, 29.81% by volume of the polyphenoxy resin and 14.63% by volume of the isocyanate resin prepared from 1 mol of trimethylolpropane and 3 mol of toluylene diisocyanate, the percentages being based on the percentage composition of the organic matrix. The dispersion was tested and further processed as stated in Example 1. The results are shown in the Tables.

COMPARATIVE EXPERIMENT 1

The conventional polyesterurethane which exhibited no adsorption onto the surface of the precipitated silica was used for the Comparative Experiment.

3,325 parts of zirconium dioxide balls having a diameter of 1.0–1.25 mm, 71.5 parts of a precipitated silica having a mean agglomerate size of 3 μm, 6.8 parts of a cubic zinc ferrite having a mean particle size of 0.12 μm, 9.2 parts of a polyolefin having an average molecular weight of 3,000 and a mean spherical particle diameter of 500 μm, 103 parts of a 14.75% strength solution of a vinyl chloride copolymer having an average molecular weight of 35,000 and a hydroxyl content of 1.8% by weight in a mixture of 45.74 parts of tetrahydrofuran and 39.51 parts of dioxane, 162 parts of a 10.62% strength solution of a linear polyesterurethane resin, prepared from adipic acid, 1,4-butanediol and 4,4'-diisocyanatodiphenylmethane, in a mixture of 47.95 parts of tetrahydrofuran and 41.43 parts of dioxane, 2.8 parts of an isomeric $C_{18}$-carboxylic acid and 848 parts of a mixture of 455 parts of tetrahydrofuran and 393 parts of dioxane were introduced into a batchwise stirred ball mill having a volume of 10,000 parts. The stirred ball mill was then closed and the contents were dispersed for 6 hours. Thereafter, the mill was opened again, 14.52 parts of a 9.26% strength solution of dibutyltin dilaurate in a mixture of 48.68 parts of tetrahydrofuran and 42.06 parts of dioxane, 5.7 parts of an 8.5% strength solution of a fluorine additive in a mixture of 49.10 parts of tetrahydrofuran and 42.4 parts of dioxane, 751 parts of a 10.62% strength solution of the linear polyesterurethane resin described above in a mixture of 47.95 parts of tetrahydrofuran and 41.43 parts of dioxane, 414.75 parts of a 14.75% strength solution of the vinyl copolymer described above in a mixture of 45.74 parts of tetrahydrofuran and 39.51 parts of dioxane, 1,807.5 parts of a mixture of 969.65 parts of tetrahydrofuran and 837.85 parts of dioxane were introduced and milling was carried out for a further 3 hours. The dispersion was tested and further processed as stated in Example 1. The results are shown in the Tables.

COMPARATIVE EXPERIMENT 2

The procedure described in Comparative Experiment 1 was followed, except that the vinyl copolymer stated in the Comparative Experiment was replaced with the same amount by volume of a polyphenoxy resin. The results are shown in the Tables.

COMPARATIVE EXPERIMENT 3

The procedure described in Example 1 was followed, except that the polyurethane was added exclusively in dispersing stage I. The results are shown in the Tables.

TABLE 1

|  | Examples | | | | | | | | Comparative Experiments | | |
|---|---|---|---|---|---|---|---|---|---|---|---|
|  | 1 | 2 | 3 | 4 | 5 | 6 | 7 | 8 | 1 | 2 | 3 |
| Gloss measurement 60° angle: | | | | | | | | | | | |
| Initial value | 51 | 40 | 52 | 32 | 62 | 92 | 48 | 61 | 58 | 40 | 60 |
| 1 h roller stand | 51 | 41 | 51 | 32 | 60 | 92 | 49 | 58 | 52 | 16 | 54 |
| 24 h roller stand | 51 | 39 | 50 | 31 | 61 | 100 | 48 | 59 | 8 | 12 | 15 |
| Roughness measurement with Perth-o-meter, cut-off 0.08 mm Peak-to-valley height (nm) | | | | | | | | | | | |
| Initial value | 85 | 95 | 84 | 120 | 76 | 64 | 110 | 78 | 114 | 87 | 77 |
| 1 h roller stand | 88 | 98 | 82 | 122 | 71 | 67 | 112 | 80 | 124 | 283 | 85 |
| 24 h roller stand | 86 | 97 | 86 | 119 | 77 | 62 | 114 | 79 | 397 | 418 | 352 |

TABLE 2

| Video value[x) | Examples | | | | | | | | Comparative Experiments | | |
|---|---|---|---|---|---|---|---|---|---|---|---|
|  | 1 | 2 | 3 | 4 | 5 | 6 | 7 | 8 | 1 | 2 | 3 |
| S/N | +1.5 | 1.3 | +1.6 | +1.0 | +2 | +2.4 | +1.1 | +2 | 0 | 0 | +0.3 |

TABLE 2-continued

| Video value[x) | Examples | | | | | | | | Comparative Experiments | | |
|---|---|---|---|---|---|---|---|---|---|---|---|
| | 1 | 2 | 3 | 4 | 5 | 6 | 7 | 8 | 1 | 2 | 3 |
| [dB]* FSM | +4 | +3.9 | +4.1 | +3.5 | +4.5 | +5 | +3.3 | +4.3 | 0 | +0.5 | +0.5 |
| [dB]* d.o./min. | 4 | 8 | 6 | 11 | 8 | 9 | 7 | 8 | 27 | 30 | 23 |

*Based on Comparative Experiment 1 as 0 dB

We claim:

1. A magnetic recording medium consisting essentially of a nonmagnetic substrate film having first and second main surfaces, a magnetic layer on one main surface of the substrate and a backing coating on the second main surface of the substrate, said backing coating consisting essentially of a polymeric binder, non-magnetic pigments, the backing coating consisting essentially of from 15 to 40% by volume, based on the volume of the backing coating, of a precipitated silica which has an $SiO_2$ content of from 98 to 98.5%, a pH of from 5 to 7 and a specific surface area of from 90 to 650 $m^2/g$ and the surface of which has been treated with from 0.05 to 0.25 $mg/m^2$ of a polyurethane which has a main molecular weight $M_w$ of from 40,000 to 120,000 and contains phosphate groups in an amount of from 10 to 100 milliequivalents of phosphate per kilogram of polyurethane.

2. The magnetic recording medium as claimed in claim 1, wherein the polyurethane is a polymer of a polyester, a polyether and diphenylmethane diisocyanate (MDI).

* * * * *

UNITED STATES PATENT AND TRADEMARK OFFICE
CERTIFICATE OF CORRECTION

PATENT NO.: 5,346,761

DATED: September 13, 1994

INVENTOR(S): ROLLER et al.

It is certified that error appears in the above-identified patent and that said Letters Patent is hereby corrected as shown below:

Cover page, item [54], last line of the Title, "PRECIPATED" should read -- PRECIPITATED--.

Column 9, claim 1, line 20, "98.5%" should read --99.5%--.

Column 10, claim 1, line 13, "main" should read --mean--.

Signed and Sealed this

Eighth Day of November, 1994

Attest:

BRUCE LEHMAN

Attesting Officer

Commissioner of Patents and Trademarks